June 20, 1933.    J. GROSCHUP    1,914,500
FISHING ROD
Filed Oct. 14, 1931    2 Sheets-Sheet 1

Inventor
Joseph Groschup
By Clarence A. O'Brien
Attorney

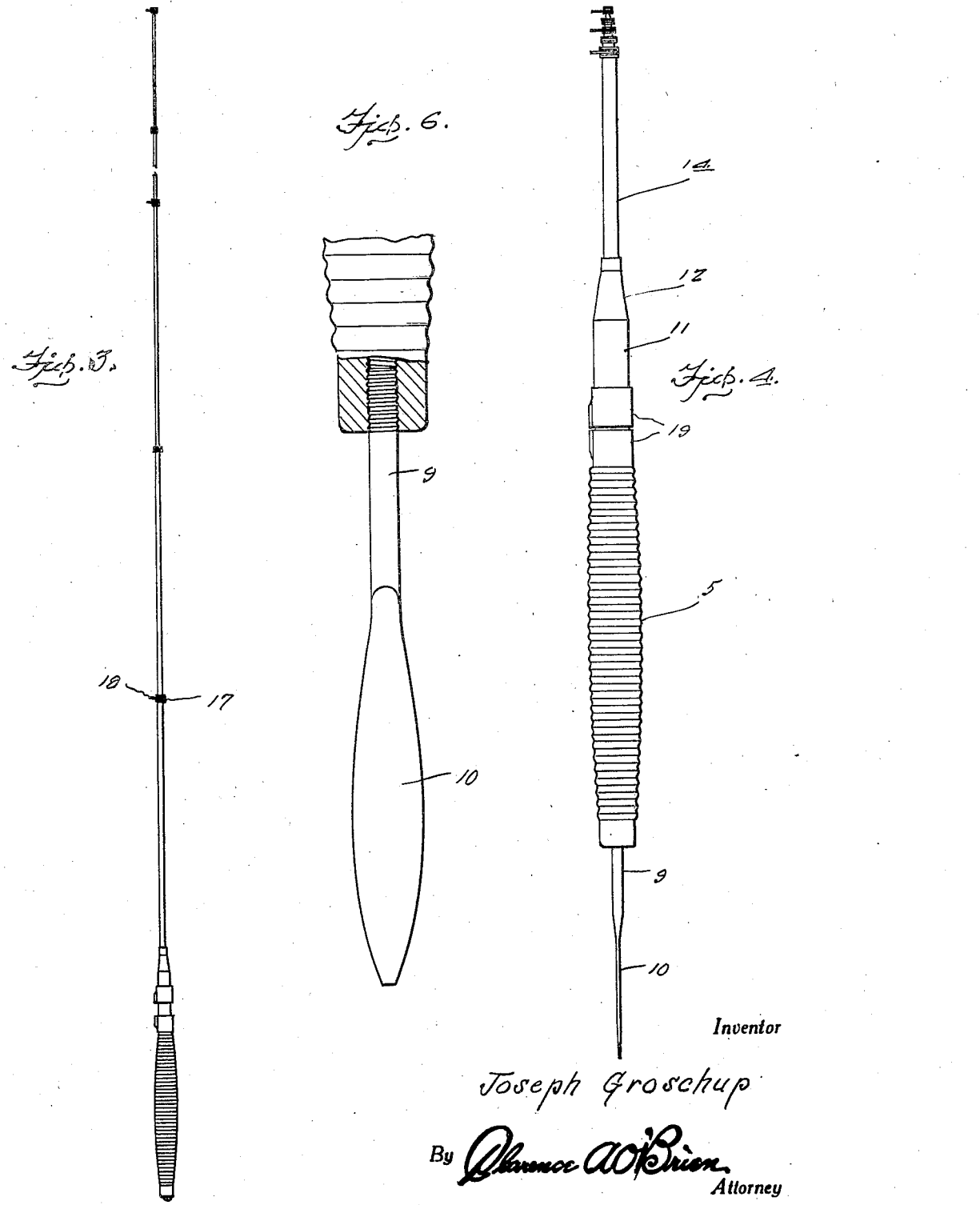

Patented June 20, 1933

1,914,500

UNITED STATES PATENT OFFICE

JOSEPH GROSCHUP, OF FORT WORTH, TEXAS

FISHING ROD

Application filed October 14, 1931. Serial No. 568,817.

The present invention relates to a fishing rod and has for its prime object to provide a device of this nature which is collapsible and provided with a detachable fish spear, gaff-hook and bank-hook which screws into the butt end of the rod.

Another very important object of the invention resides in the provision of a fishing rod of this nature which is simple in its construction, inexpensive to manufacture, strong and durable, easy to manipulate, thoroughly efficient and reliable in use, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 3 is an elevation of the rod in extended position,

Figure 4 is an elevation of the rod in collapsed position.

Figure 6 is a detail section through the bottom end of the butt section showing the spear in place.

Figures 1, 2, 5:
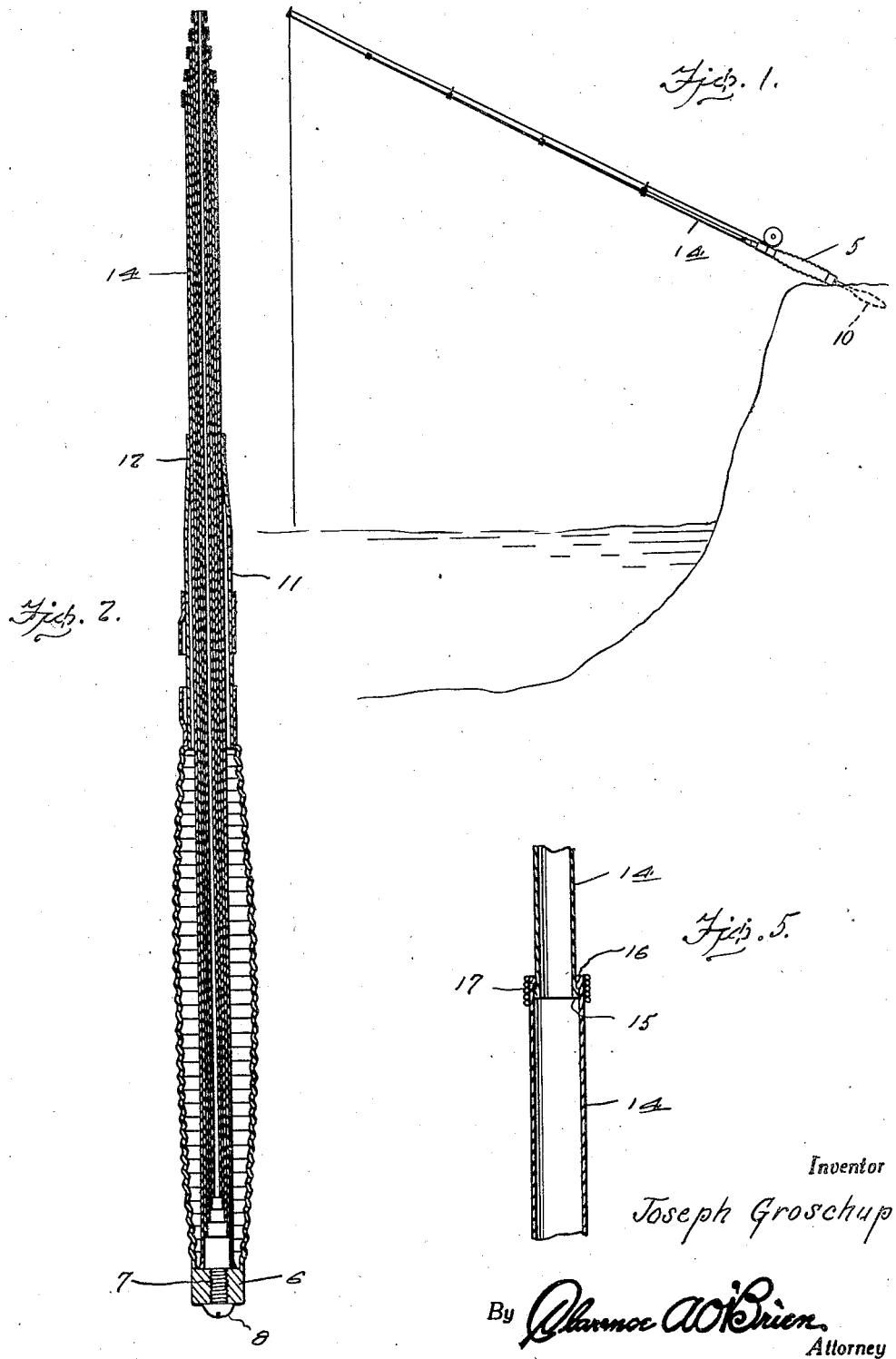
Figure 1 is an elevation of the fishing rod showing the bank-hook in use.
Figure 2 is a longitudinal section through the rod in a collapsed position.
Figure 5 is a detail section through a pair of the telescopically associated sections.

Referring to the drawings in detail it will be seen that the numeral 5 denotes a hollow butt section which is corrugated to provide a proper gripping surface. The diameter of the bore of the butt section 5 is largest at its center and decreases toward its ends. Bottom end 6 is formed with a threaded opening 7 to receive a screw 8 or to receive threaded portions of a shank 9 on which is formed a spear head 10 which may be used as a gaff-hook or a bank-hook.

At the other or upper end of the butt section there is fixed a tube 11 extending upwardly therefrom and having its upper end tapered as at 12. Numerals 14 denote a plurality of telescopically associated sections slidable into the tube 11 and the butt section as is clearly illustrated in Figure 2. The inner ends of the sections 14 are provided with outwardly disposed annular shoulders 15 while at their outer or upper ends they are provided with inward annular abutment shoulders 16. A coil of wire 17 is disposed about the outer end of each section 14 and terminates in an eye 18 through which the line may be threaded. A pair of reel holding sleeves 19 are slidable on the tube 11.

The steel tubing out of which the sections are made is of tempered steel of such thickness and so flexible as to enable the user to fish therewith for either large ocean fish or smaller fish found in inland streams. The butt section of the rod is of thick steel and as stated above is corrugated in such a manner as to allow the user a firm and secure handhold without the danger of it slipping or shifting in times of stress while attempting to land a large and wily fish or through undue perspiration of the hand. The weight of the butt section is sufficient to offset and equalize the weight of the other sections of the rod. When it is desired to use the rod as a fish spear, the three end sections may be telescoped into the butt section and the tube, thus giving the user a well balanced and poised fish spear. The additional weight incident to the base section into which the spear head screws, enables the missile to strike its target with a great velocity and the fact that the maximum weight of such spear is centered in the near vicinity of the spear head, is also conducive toward truer markmanship. When it is intended to use this rod and the spear head so screwed into the butt section as a combined gaff-hook and fish rod, the very fact that the gaff-hook is attached to the heavier base or butt section enables the user to strike the fish with a greater force and with much less danger of breaking such rods because of the fact that the butt section is the heaviest and thickest section of the rod. When the user desires to do bank or trot-line fishing by ramming the spear head into the earth, the rod is thus held steady and firm.

It is thought that the construction, utility and advantages of this invention will now be quite apparent to those skilled in this art without a more detailed description thereof.

The present embodiment of the invention has been described in considerable detail merely for the purpose of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

A fishing rod of the class described comprising a hollow corrugated handle tapering from its center toward its ends, a tube having one end connected with one end of the handle and the opposite end of the tube tapering to a reduced cylindrical portion at the extremity of the tube, telescoping tubular sections slidably arranged in the tube, each section having an exterior shoulder forming portion at its inner end and an interior shoulder forming portion at the outer end, the said shoulder forming portions engaging when the sections are extended, the first section having a sliding fit with the reduced cylindrical portion of the tube with the exterior shoulder on the first mentioned section engaging a portion of the tapered part of the tube when said first section is extended, a coil passing around the outer end of each section and located over the internal shoulder carrying part and having an eye forming part projecting therefrom, the opposite end of the handle having a threaded hole therein for receiving a threaded end of a member.

In testimony whereof I affix my signature.

JOSEPH GROSCHUP.